United States Patent [19]

[11] 3,891,995

Hanazono et al.

[45] June 24, 1975

[54] MAGNETIC HEAD

[75] Inventors: Masanobu Hanazono; Osamu Asai; Kanji Kawakami, all of Hitachi, Japan

[73] Assignee: Hitachi, Ltd., Japan

[22] Filed: Sept. 4, 1973

[21] Appl. No.: 394,257

[30] Foreign Application Priority Data

Sept. 14, 1972 Japan .............................. 47-91708

[52] U.S. Cl. .............................................. 360/123
[51] Int. Cl. .............................................. G11b 5/20
[58] Field of Search ...................................... 360/123

[56] References Cited

UNITED STATES PATENTS 3,564,558 2/1971 Tolman et al ......................... 360/39
3,611,417 10/1971 Saurer et al. ......................... 360/39

*Primary Examiner*—Vincent P. Canney
*Attorney, Agent, or Firm*—Craig & Antonelli

[57] ABSTRACT

A magnetic head fabricated through the thin film technique and used with a magnetic drum or disk of an electronic computer. The magnetic head comprises a first magnetic material forming a part of a magnetic flux path; a second magnetic material forming another part of the magnetic flux path; at least two conductors superposed between the first and second magnetic materials, with insulating films inserted between the magnetic materials and the conductors and between the conductors; two lead conductors, one being connected with one end of the lowermost conductor and the other being connected with that end of the uppermost conductor which is opposite to the one end of the lowermost conductor; and coil forming conductors connected with the remaining ends of the conductors disposed between the first and second magnetic materials, wherein the coil forming conductors are insulated from each other but have the end portions where they are electrically connected in a predetermined manner, and wherein the coil forming conductors are substantially superposed on each other to form parts of turns of a coil.

10 Claims, 8 Drawing Figures

MAGNETIC HEAD

BACKGROUND OF THE INVENTION

1. Field of the Invention

The present invention relates to a magnetic head for use with a magnetic drum or disc of an electronic computer, and more particularly to a magnetic head fabricated through the thin film technology.

2. Description of the Prior Art

Magnetic heads, which are used for the writing and reading of the data in an electronic computer, are disposed in the vicinity of the magnetic drum or disc, supported on a mounting member. The exciting circuits provided for the respective heads are selectively energized thorough a change-over operation according to the necessity of access. The access time in this method is much shorter than in the head shift system wherein the head or heads is moved so as to abut against the desired track.

Therefore, the interval between the adjacent heads formed on a substrate should be as small as possible so as to increase the number of heads formed on the substrate per unit length, that is, to improve the number of tracks provided on a magnetic drum or disc per unit length across its width.

The conventional magnetic head fabricated through thin film technology has the following structure. In a substrate are formed two thin films of magnetic material and thin films of conductive material are formed between them, stacked one upon another and crossing the magnetic films. The conductor films form coils at the rear ends of the magnetic films.

With a magnetic head having such a structure as described above, the amount of magnetic flux passing between the front ends of the magnetic films is not so large as with an ordinary magnetic head of block type, due to the relative geometry between the conductor and magnetic films, in which the conductor films have no effect of coil turns but only serve as so many straight conductor lines passing near the magnetic tips of the heads. Accordingly, with this structure, the ratio of the read voltage to the write current is small. In order to increase the amount of flux passing between the front ends of the magnetic films without increasing the current through the conductor films, it is necessary to form through the thin film technique conductor films in such a manner that the magnetic films may be surrounded by a length of helical conductor. According to this method, however, each magnetic film must be long enough so that the efficiency of the resulting head is degraded. Another example of the way of arranging a conductor around the magnetic films is a spiral conductor film passing between the magnetic films. According to this arrangement, the area occupied by the spiral conductor increases with the number of turns of the spiral conductor, so that the arrangement goes against the technical requirement that as many magnetic heads as possible should be formed side by side so as to improve the number of tracks on a magnetic drum or disc per unit length across its width.

SUMMARY OF THE INVENTION

A first object of the present invention is to provide a magnetic head in which a larger amount of flux is produced through the magnetic films by a smaller amount of current through the conductive films.

A second object of the present invention is to provide a magnetic head in which the number of conductors passing between the magnetic films is large enough.

A third object of the present invention is to provide a magnetic head block which is constituted of a plurality of heads each being as narrow in width as possible.

A fourth object of the present invention is to provide a magnetic head in which irrespective of the number of the conductors between the magnetic films, the breaking of conductor films due to overlapping is prevented.

Therefore, the present invention provides a magnetic head comprising a first magnetic material forming a part of a magnetic flux path; a second magnetic material forming another part of a magnetic flux path; at least two conductor layers superposed one upon another, with insulating films electrically isolating the superposed conductor layers from each other and from the first and second magnetic materials; a lead conductor connecting one end of the uppermost conductor layer with one end of the lowermost conductor layer; and coil forming conductors connecting the ends of intermediate conductor layers externally of the magnetic materials, wherein the coil forming conductors are insulated from each other but electrically connected with one another by a common connection through the insulation, externally of the magnetic materials, and wherein the coil forming conductors are substantially superposed on each other to form turns of a coil.

DESCRIPTION OF THE PREFERRED EMBODIMENT

Figure 1:
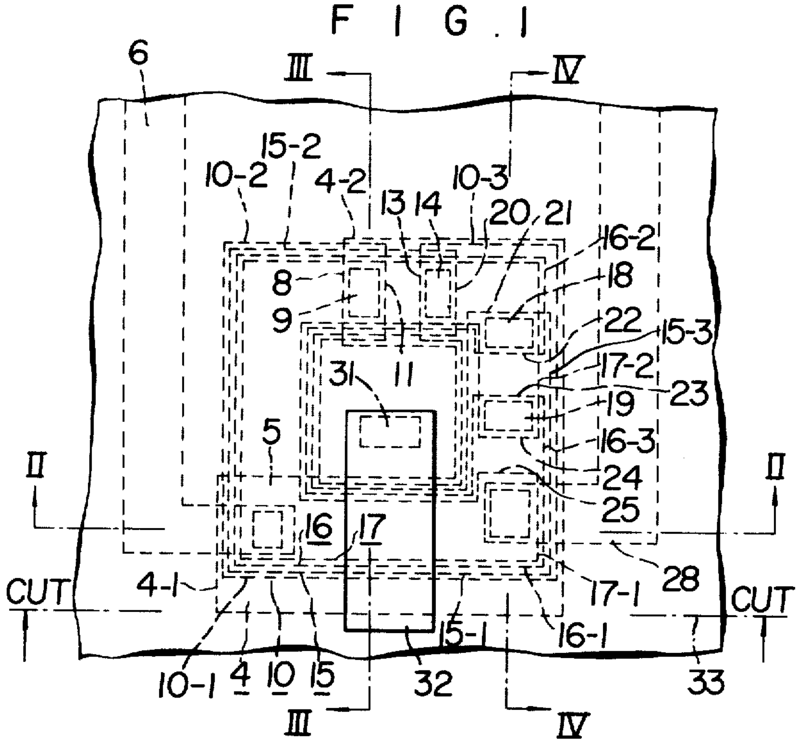
FIG. 1 is a plan view of a magnetic head embodying the present invention.

According to the present invention, material used as a substrate may be selected from among glass, $Al_2O_3$, quartz, BN, and oxides, nitrides and borides of chemical- and heat-resistive metals. Alternatively, a composite substrate formed of metal plate covered with one of such materials as mentioned above, and an oxide ferrite substrate which is formed by pressing ferrite oxide into a plate, may also be employed. The latter is especially preferable since it can serve as magnetic flux paths as well as a substrate. Magnetic material to form flux paths is permalloy, $MeFeO_4$ such as $NiFe_2O_4$ and $(NiZn)Fe_2O_4$, or Ni-Co alloy.

Magnetic paths of permalloy can be formed on a substrate by chemical or electrical plating or a vacuum vapor-deposition method. The conditions for plating are as follows.

| Composition of plating bath | |
|---|---|
| $NiSO_4.7H_2O$ | 300 g/liter |
| $FeSO_4.7H_2O$ | 10 g/liter |
| $H_3BO_3$ | 40 g/liter |
| $NiCl_2.6H_2O$ | 10 g/liter |
| pH | 2.5 |
| Current density | 25 mA/cm² |
| Plating velocity | 0.2 μ/minute |
| Composition of plated material | Ni(81%)-Fe(19%) |

The method of chemical vapor deposition is another way of forming a magnetic material layer on the substrate. The following is a reaction formula associated with such chemical vapor deposition method, in which Me represents a metal such as Ni, Mn or Zn and X designates halogens.

$$MeX_2 + H_2O \rightarrow MeO + 2HX$$
$$+ 2FeX_3 + 3H_2O \rightarrow Fe_2O_3 + 6HX$$
$$MeX_2 + 2FeX_3 + 4H_2O \rightarrow MeFe_3O_4 + 8HX \quad (1)$$

An example of the above described vapor reaction is as follows. A MgO substrate is placed in a reaction tube maintained at a temperature of 700°C in an electric furnace and $NiBr_2$, $FeBr_3$ and water vapor with carrier gas, at the total pressure of 30 mmHg and the water vapor pressure of about 10 mmHg, are introduced into the reaction tube for about 5–10 hours. As a result of this reaction, a film of $NiFe_2O_4$ having a thickness of about 1 mm is formed on the substrate.

By using a similar chemical reaction, it is also possible to form a hexagonal ferrite layer of yttrium-iron-garnet ($Y_3Fe_5O_{12}$).

In another example, organic an vehicle into which powder of magnetic material is diffused, is printed or applied onto a substrate and the substrate with the printed or applied material thereon is then fired to remove the organic material so that a magnetic film is left behind.

It is necessary in the vapor deposition of permalloy to maintain the temperature of the vaporizing source at 1,100°C or above and the degree of vacuum in the hermetical vessel at $10^{-4}$–$10^{-10}$ Torr. In the DC sputtering method, the degree of vacuum in the hermetical vessel is 3-10 × $10^{-2}$ Torr and the applied voltage is 1-6 kV. The vacuum flash deposition method or the electron beam evaporation method is also available for the vapor deposition of permalloy.

$SiO_2$, $Al_2O_3$, $Ta_2O_5$, TaN, $ZnFe_3O_4$, $CdFe_2O_4$ and glass are used for insulating films. These materials can be formed into thin films through a vapor deposition, sputtering or chemical vapor deposition technique. Alternatively, $SiO_2$ film can be formed by contacting a mixture of oxygen and $SiH_4$ or $CH_3SiCl$ gas diluted by inert gas with a substrate heated up to temperatures at which the above-mentioned gases are decomposed. In case of forming $Al_2O_3$ film, the following reaction is available:

$$2AlCl_3 + 3H_2O \rightarrow Al_2O_3 + 6HCl \quad (2)$$

This reaction takes place at temperatures above 800°C. Also, by utilizing the reaction represented by the formula (1) can be formed a non-magnetic metal oxide or non-magnetic garnet layer having the same crystal structure as ferrite such as $ZnFe_2O_4$ or $CdFe_2O_4$.

Further, $Al_2O_3$ film can be formed by subjecting a vapor-deposited Al film to anode oxidizing.

A silicon oxide $SiO_2$ film is formed under a condition that the temperature of the vaporizing source is at 1,250°–1,400°C and the degree of vacuum in the evacuated vessel is 1 × $10^{-4}$ – 1 × $10^{-10}$ Torr. An $Al_2O_3$ or a glass layer is more easily formed through sputtering in an atmosphere of argon.

Al, Cu, Pt, Pd, Au, Ag and other ordinary conductive non-magnetic metals are used as conductive films. The films of the above-mentioned metals can be formed through vapor-deposition, sputtering or chemical vapor deposition, and they, except the Al film, may also be formed by the chemical or electric plating method. Moreover, the films of the metals except Al and Cu can be formed by firing an organic vehicle with metal powder and a small amount of glass powder mixed therewith, in an appropriate atmosphere. Further, the films of the metals can be formed on the substrate by sticking the foils of the metals onto the substrate and etching the foils into predetermined patterns, or by sticking the foils having the predetermined patterns onto the substrate. An insulating film may be provided on the entire surface of each foil or on a portion of the surface of the foil, with which a conductive film is connected.

The conductive film can be formed by contacting a metal halogenide diluted by inert gas or hydrogen gas with a substrate heated up to temperatures at which the metal halogenide is decomposed. The film of noble metal such as Pt, Ag, Au or Pd can also be formed by applying the oxide of the metal onto a substrate and then reducing the metal oxide in the flow of hydrogen gas.

The films of these materials may be formed through a photo-etching technique. In a typical photoetching method, a photoresist material having a predetermined shape is printed on a metal thin film formed on a substrate through vapor-deposition or plating and the thin metal film is immersed in an etching solution containing acid, alkali or neutral salt so as to etch off the undesired portion of the film, so that the portion of the metal thin film corresponding to the appropriately shaped photoresist is left behind. And only the desired metal film can be etched without solving another metal film formed underneath if the etchant is appropriately chosen. In order to make side-etching less than immersion-etching, the electrolytic etching is proposed in which etching is performed by using as anode a metal film to be etched on which photoresist material is printed. In this case, a metal film formed underneath the anode metal film is often damaged and a thin metal or inorganic film resistive to electrolytic etching should be previously formed on the metal film in danger of being damaged.

The magnetic head according to the present invention is fabricated by using such materials and thin film techniques as described above. The most notable feature of the magnetic head is the shape of the conductors passing between the magnetic materials. In order to clarify the relationship between the conductors and the other materials in the magnetic head according to the present invention, the magnetic thin films formed on the substrate will first be described.

Magnetic heads are formed near the periphery of a substrate. On the periphery of the substrate is formed a first magnetic thin film to serve as a part of magnetic flux paths. Between the first magnetic thin film and the substrate and on the first magnetic thin film are formed continuous insulating films. Thin conductor films which are most characteristic of the present invention, are then formed on the continuous insulating film, transversely crossing the first magnetic film. Insulating films are provided between adjacent conductor films. A first to an *n* th coil forming conductors are connected with the ends of the thin conductor films. The first coil forming conductor is connected only with one end of the thin conductor film nearest the first magnetic film. The second coil forming conductor is connected with that end of the thin conductor film secondly nearest the first magnetic film which is opposite to the first coil forming conductor. The third coil forming conductor is connected with that end of the thin conductor film secondly nearest the first magnetic film which is opposite to the second coil forming conductor. The fourth coil forming conductor is connected with that end of the thin conductor film thirdly nearest the first magnetic film which is on the same side as the second coil forming conductor. In like manner, coil forming conductors, up to the $(n-1)$th coil forming conductor, are connected with the associated ends of the respective thin conductor films. And the *n* th coil forming conductor is connected with that end of the thin conductor film remotest from the first magnetic film which is on the same side as the second coil forming conductor. The first to *n* th coil forming conductors are led backward around the first magnetic film and the first and second coil forming conductors are connected with each other, the third and fourth coil forming conductors are connected with each other, . . . , and the $(n-1)$th and *n* th coil forming conductors are connected with each other. Insulating films are provided between adjacent coil forming conductors. Each insulating film is so formed as to completely cover the associated coil forming conductor and a perforation is formed in a portion of the insulating film near the end of the conductor for the interconnection between mated coil forming conductors. Through the perforations in the insulating films are performed the predetermined connections of the first coil forming conductor with the second one, the third with the fourth, . . . , and the $(n-1)$th with the *n* th.

The coil forming conductors are so disposed as to be symmetric with respect to the center line of the first magnetic film and as to be in superposed relation to each other.

In this way, the plural thin conductor films and the first to the *n* th coil forming conductors serve as a coil having a plurality of turns. A second magnetic film is provided which extends from that end of the first magnetic film which is the remotest from the periphery of the substrate, to lie over the uppermost conductor film. The second magnetic film and the first magnetic film are connected directly with each other at the remotest end of the latter. Of course, the second magnetic film and the uppermost conductor are separated from each other by an insulating film. A pair of lead conductors are so provided as to be connected respectively with the free ends of the lowermost and uppermost conductor films disposed between the first and second magnetic films, which lead conductors serve as energizing terminals of the completed magnetic head. In the structure of the thus completed magnetic head, the peripheral portion of the substrate is so removed through grinding and polishing as to cause the ends of the first and second magnetic films to appear in the polished surface of the substrate, so that the distance between the magnetic head tip and the magnetic recording medium can be rendered as small as possible.

In the foregoing description, the thin conductor films and the first to the *n* th coil forming conductors are formed separately. However, the lowermost conductor film and the first coil forming conductor; the adjacent conductor film, the second and third coil forming conductors; etc. can be formed integrally. In this case an insulating film can be formed to cover each conductor film having integral lead-around portions. Each end of the coil forming conductor is so disposed as to overlap the end of another coil forming conductor adjacent beneath.

The end of each coil forming conductor may be located anywhere on the adjacent coil forming conductor if the end is not so near the first magnetic film. In this case, the lead conductors are extended in any direction desired and the total width of the magnetic head equals the width of the coil forming conductors plus the sum of the widths of the two lead conductors.

In the preceding description, the coil forming conductors are all superposed on each other, but even if the arrangement of the coil forming conductors between the lead conductors is modified in any possible manner, the width of the magnetic head itself does not increase. Moreover, if the lead conductors are disposed in superposed relation to the coil forming conductors, the width of the magnetic head equals the width of the coil forming conductors.

Further, if the ends of the coil forming conductors are horizontally separated from each other between the lead conductors, the overlapping portions do not meet in one portion so that the number of turns may be selected to be more than two.

In another embodiment of the present invention, a ferrite substrate is used and in this case there is no need for the first magnetic film since the substrate itself serves as such a magnetic film, so that the coil forming conductors can be flatly formed and therefore the danger of conductor breaking can be minimized.

Now, the present invention will be described with the aid of the attached drawings.

Figure 2:
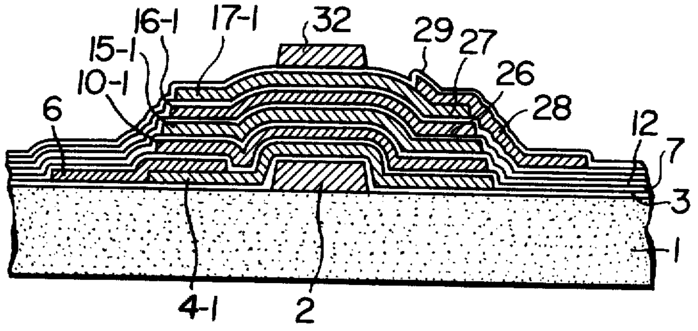
FIG. 2 is a cross section taken along the line II—II in FIG. 1.
Figure 3:
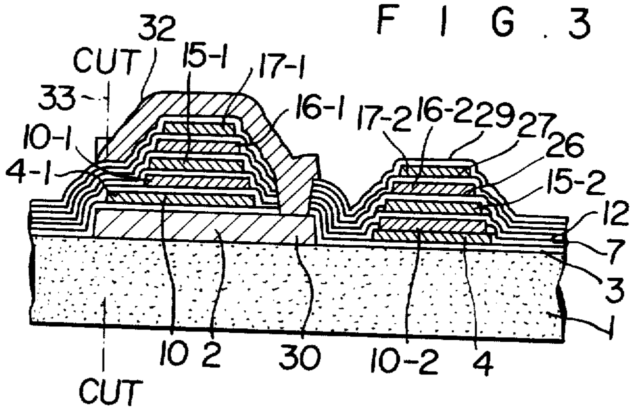
FIG. 3 is a cross section taken along the line III—III in FIG. 1.
Figure 4:
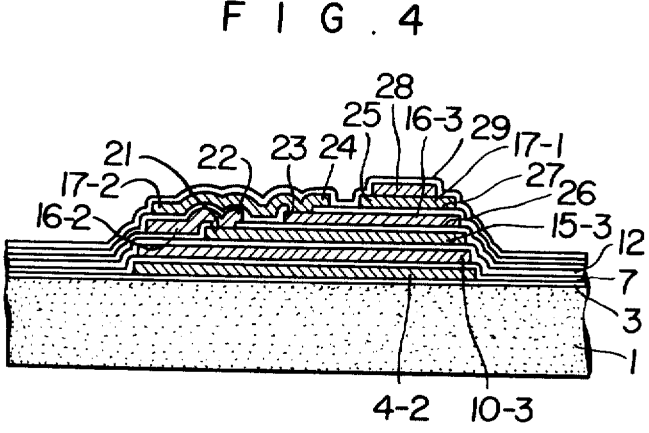
FIG. 4 is a cross section taken along the line IV—IV in FIG. 1.
Figure 5:
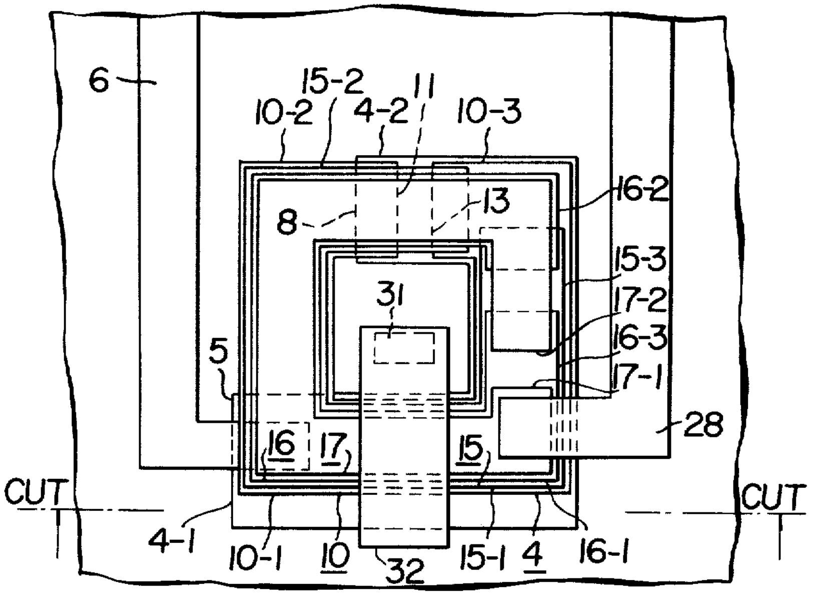
FIG. 5 is a plan view of the magnetic head shown in FIG. 1, with an insulating layer removed.

FIG. 1 is a plan view of a magnetic head embodying the present invention, FIG. 2 is a cross section taken along the line II—II in FIG. 1, FIG. 3 is a cross section taken along the line III—III in FIG. 1, FIG. 4 is a cross section taken along the line IV—IV in FIG. 1, and FIG. 5 is a plan view of the magnetic head shown in FIG. 1, with the insulating films between the first magnetic film and the lowermost conductor film, between the adjacent conductor films and between the adjacent coil forming conductors, removed so as to clarify the relative disposition of the conductors. In those figures, a first magnetic film 2 is formed on a substrate 1 and a vapor-deposited insulating film 3 of SiO is so formed as to cover the magnetic film 2 and the remaining surface of the substrate 1. On the insulating film 3 is formed a conductor film 4 consisting of a first conductor 4-1 and a first coil forming conductor 4-2. A lead conductor 6 is formed on the end 5 of the first conductor 4-1 through vapor deposition or photoetching. An insulating film 7 is so formed to cover the conductor 4-1, the first coil forming conductor 4-2 and the lead conductor 6. An opening 9 is formed through photoetching in that portion of the insulating film 7 which lies on the end portion 8 of the first coil forming conductor 4-2. On the portion of the insulating film 7 corresponding to the conductor 4 is formed a second conductor film 10 consisting of a conductor 10-1, a second coil forming conductor 10-2 and a third coil forming conductor 10-3. The end 11 of the second coil forming conductor 10-2 rises from the opening 9 while the end 13 of the third coil forming conductor 10-3 rests above the first coil forming conductor 4-2 at a small distance from the end 11. An insulating film 12 is so formed as to cover the conductor film 10 and the surface of the substrate 1. An opening 14 is formed through photoetching in that portion of the insulating film 12 which lies on the end portion 13. In like manner, a conductor film 15 consisting of a conductor 15-1, a fourth coil forming conductor 15-2 and a fifth coil forming conductor 15-3, a conductor film 16 consisting of a conductor 16-1, a sixth coil forming conductor 16-2 and a seventh coil forming conductor 16-3, a conductor film 17 consisting of a conductor 17-1 and an eighth coil forming conductor 17-2, openings 18 and 19, end portions 20, 21, 22, 23, 24 and 25, and insulating films 26 and 27, are formed. A lead conductor 28 is formed on the end portion 25 and the film 28 is bent perpendicularly and extended on the insulating film 27 on the substrate 1. An insulating film 29 is so formed as to cover the conductor 17, the lead conductor 28 and the insulating film 27. In this way, the conductors 4-1, 10-1, 15-1, 16-1, 17-1, and the coil forming conductors 4-2, 10-2, 10-3, 15-2, 15-3, 16-2, 16-3 and 17-2 are superposed one upon another in the same configuration to form a spiral arrangement. An opening 31 is formed through the insulating films 3, 7, 12, 26, 27 and 29 and a second magnetic film 32 is formed through the opening 31, as shown in FIGS. 1, 2, 3 and 5. The thus formed magnetic head is then allowed to make a cut along the cut line 33.

In the magnetic head shown in FIGS. 1 through 5, the superposed coil forming conductors occupy the same area and only the lead conductors occupy additional areas, so that the area occupied by the magnetic head itself remains the same even if the number of the conductor films over the first magnetic film and the associated coil forming conductors is increased.

As described above, the lead conductors may be formed in the same position as the coil forming conductors. In such a case, the lead conductor 6 is extended straight from the end portion 5 while the lead conductor 28 is extended along the eighth conductor 17-2, the connection of the lead conductor 28 with the end portion 25 being performed through an opening formed in the portion of the insulating film on the end portion 25. In this structure, the width of the resulted magnetic head is the same as that of each coil forming conductor.

On the other hand, if a ferrite substrate is used so that it may provide a magnetic flux path which is otherwise established through the first magnetic film, then the conductors 4, 10, 15, 16 and 17 can be flatly formed.

Figure 6:
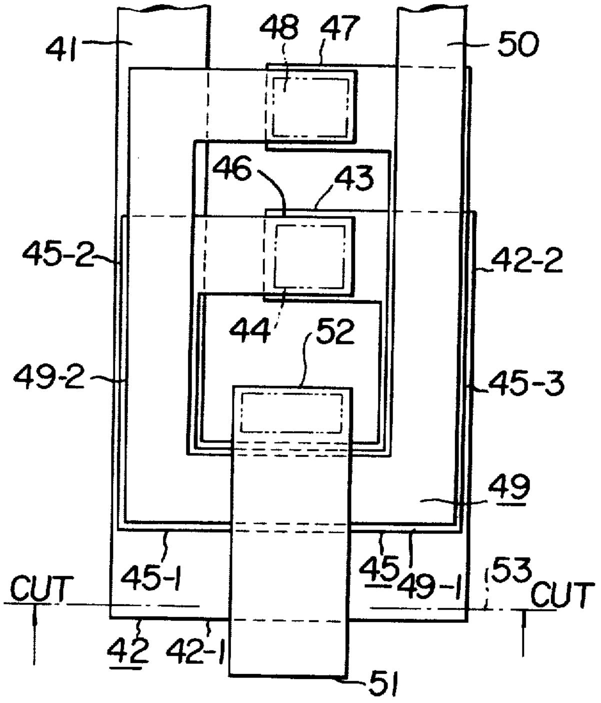
FIG. 6 is a plan view of a magnetic head as another embodiment of the present invention.

FIG. 6 shows in plan a magnetic head as another embodiment of the present invention, in which all insulating films are taken away to show the structure of the conductor films and the magnetic films more clearly. In the actual structure, insulating films are provided between the adjacent conductor films, between the first magnetic film and the lowermost conductor film, between the second magnetic film and the uppermost conductor film, and between the adjacent coil forming conductors, as shown in FIGS. 1 to 4. In this embodiment, a conductor film 42 consisting integrally of a lead conductor 41, a conductor 42-1 and a first coil forming conductor 42-2, is formed through vapor deposition, plating or photoetching on a ferrite substrate (not shown) of Mn-Zn, Ni-Fe or Ni-Zn system. The conductor film 42 having the integral lead conductor 41, conductor 42-1 and first coil forming conductor 42-2, is roughly in the form of FIG. 6. Insulating films are formed respectively on the conductor 42 and the lead conductor 41 and an opening 44 is formed through the portions of the insulating films which lie over the end portion 43 of the first coil forming conductor 42-2. A conductor film 45 constituted integrally of a conductor 45-1, a second coil forming conductor 45-2 and a third coil forming conductor 45-3, is formed on those portions of the insulating film which lie on the lead conductor 41, the conductor 42-1 and the first coil forming conductor 42-2, the conductor film 45 starting from the opening 44. The end portion 47 of the third coil forming conductor 45-3 is located externally of the end portion 46 of the second coil forming conductor 45-2 and the conductor film 45 is roughly in the form of rounded delta δ so that it is superposed, except its end portion 47, upon the conductor film 42. An insulating film (not shown) is so formed as to cover the conductor film 45 and the substrate and an opening 48 is formed in the portion of the insulating film lying on the end portion 47. A conductor film 49 constituted integrally of a conductor 49-1, a fourth coil forming conductor 49-2 and a lead conductor 50, is superposed on that portion of the insulating film which lies on the conductor film 45, the conductor film 49 starting from the opening 48. The conductor film 49 is roughly in the form of J. An insulating film (not shown) is so formed as to cover the conductor film 49 and the substrate. A second magnetic film 51 perpendicularly crosses the superposed conductors 42-1, 45-1 and 49-1, and the end portion 52 of the magnetic film 51 is in direct contact with the ferrite substrate. Finally, the thus formed magnetic head is cut along the line 53.

As described above, the magnetic head shown in FIG. 6 has a coil with at least two turns of conductors, in which the connecting parts (43-46, 47-49) of the coil forming conductors, located between the lead conductors 41 and 50, are so arranged as not to superpose each other. In this arrangement, the longitudinal length, i.e., depth, of the resulted head itself increases as the turns of the coil increase, but its transverse length, i.e., width, is independent of the number of the turns, remaining the same. If the connecting parts of the coil forming conductors are disposed in such a manner that the later is the formation of the connecting part the remoter is the location of the part from the second magnetic film, then each coil forming conductor, except the first one, steps down the previously formed coil forming conductor and is extended onto the surface of the substrate. In this case, each step-down equals the thickness of a single coil forming conductor so that the breaking of coil forming conductors can be effectively prevented even if a great number of turns are formed.

In this embodiment shown in FIG. 6, a ferrite substrate is employed, but there is no inconvenience in forming the conductor films, the second magnetic film and the insulating films etc. according to this embodiment on such a substrate with a first magnetic film formed thereon as shown in FIGS. 1 to 4.

The characteristics of the magnetic head according to the present invention are as follows. Before the description of the characteristics, the structure of a magnetic head whose characteristics are to be measured, will be described. The used substrate is of a ferrite of Zn-Mn system. A conductor, 90 μ wide and 3 μ thick, and a conductor, 40 μ wide and 6 μ thick, are superposed with an insulating film inserted therebetween. The lead conductors, the first and the second coil forming conductors have a width of 100 μ. The second magnetic material is 190 μ wide, 250 μ long and 10 μ thick, and it is formed to cross over the first conductor of 90 μ wide and the second conductor of 40 μ wide. An insulating film of $SiO_2$ having a thickness of 1 μ is interposed between the second magnetic material and the adjacent conductor. The first and second magnetic materials are connected with each other at the respective end portions thereof opposite to the portions where a magnetic recording media passes through. The area of the connection of the first and second magnetic material is 170 μ × 80 μ.

Figure 7:
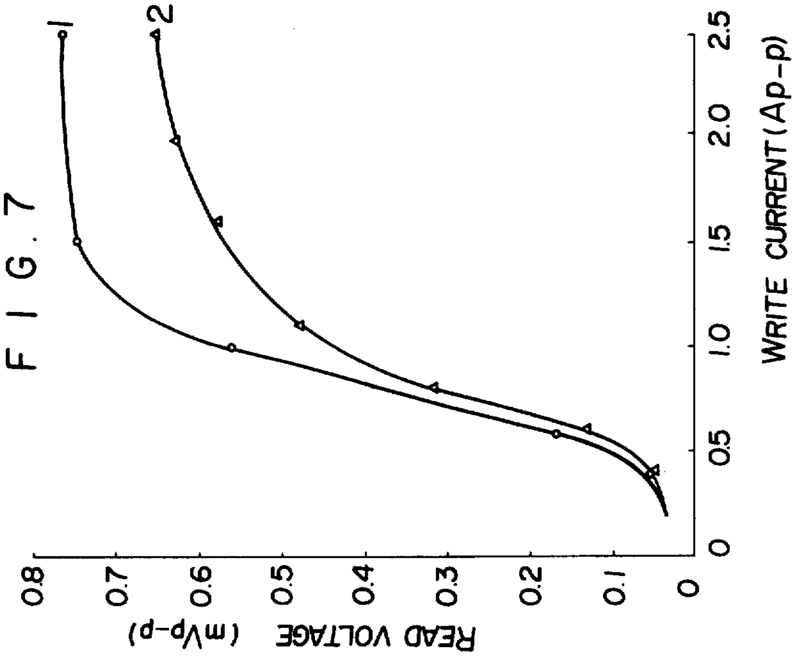
FIG. 7 shows a relationship between the read voltage and the write current of a magnetic head in which only one conductor is passed through the two magnetic flux paths.

FIG. 7 shows the relationship between the write current (peak to peak) and the read voltage (peak to peak) in a magnetic head in which only a conductor, 90 μ wide and 6 μ thick, is passed between the two magnetic flux paths. In FIG. 7, curves 1 and 2 correspond to the characteristics, obtained in case where the frequency of the current through the conductor is 500 kHz and in case where such frequency is 1.25 MHz, respectively.

Figure 8:
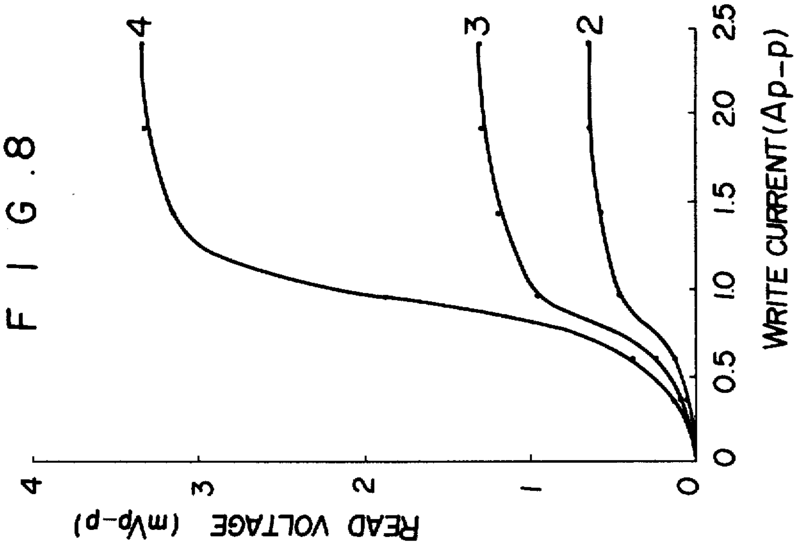
FIG. 8 shows a relationship between the read voltage and the write current of a magnetic head in which at least two conductors are passed through the two magnetic flux paths.

FIG. 8 is a graphic representation of the relation between the write current and the read voltage in a magnetic head in which more than one conductors are passed between the two magnetic flux paths. In FIG. 8, curve 2 corresponds to the case where only one conductor is passed between the magnetic flux paths, as in FIG. 7; curve 3 is for the magnetic head described above with concrete dimensions, in which two conductors are provided between the magnetic flux paths; and curve 4 is for a magnetic head which has five superposed conductors between the two magnetic flux paths, insulating films being interposed between the magnetic materials and the conductors and between the conductors, the lowermost conductor being 90 μ wide and 3 μ thick and each of the other four conductors being 40 μ wide and 6 μ thick.

As seen from FIGS. 7 and 8, with a magnetic head according to the present invention, the greater is the number of the conductors between the magnetic flux paths, the higher is the read voltage, if the write current is kept constant.

Each magnetic head for use with an electronic computer needs an amplifier, which serves to step the read voltage up to a voltage high enough to drive the computer or to convert the signal from the computer into a suitable current, i.e., write current, to store data into a magnetic medium. With a magnetic head having only one conductor between the magentic flux paths, the ratio of the read voltage to the write current is small so that an amplifier having a great amplification factor must be used and that the withstand voltage of such an amplifier must be higher than 100 V. On the other hand, the magnetic head according to the present invention, which has at least two conductors between the two magnetic flux paths, can be combined with an amplifier formed of a thin film IC circuit. Accordingly, a computor using magnetic heads according to the present invention will be less expensive. With a conventional magnetic head which has spiral conductors on the substrate or helical conductors about the magnetic film, the appreciable increase in the read voltage cannot be observed even if the number of the conductors between the magnetic flux paths increases. Namely, the read voltage derived from a magnetic head having more than five conductors between the magnetic flux paths is nearly equal to that obtained from a magnetic head having a single conductor between the flux paths.

We claim:

1. A magnetic head comprising:

a first magnetic film and a second magnetic film disposed on a substrate, said first and second magnetic films forming a magnetic gap therebetween at one of the respective ends thereof, said gap lying substantially in a plane including an end surface of said substrate, said first and second magnetic films being magnetically coupled with each other at the other respective ends thereof;

a plurality of electrically conductive films laid one upon another substantially on a given area on said substrate when seen in plan view, the lamination of said plurality of electrically conductive films traversing an area between said first and second magnetic films, said plurality of electrically conductive films being electrically insulated from one another and from said first and second magnetic films;

a plurality of coil forming electrically conductive members including first, second, third and fourth portions, said first and second portions respectively extending from respective ends of respective ones of said plurality of electrically conductive films in a direction opposite to said end surface of said substrate, said third and fourth portions respectively extending toward each other from the respective extended ends of said first and second portions, said first and second portions being respectively laid one upon another substantially on respective given areas on said substrate, the respective extended ends of said third and fourth portions being electrically connected with each other outside of said area between said first and second magnetic films so that said plurality of electric conductive films are connected in series through said plurality of coil forming electrically conductive members to thereby form a continuous coil, the respective connections between said third and fourth portions being disposed, when seen in plan view and in the longitudinal direction of said lamination of said plurality of electrically conductive films, within a length which is obtained by moving in parallel the length of said lamination of said plurality of electrically conductive films and outside of said area between said first and second magnetic films; and a pair of lead-out electrically conductive members respectively connected to the two free ends of said continuous coil formed by said plurality of electrically conductive films and said plurality of coil forming electrically conductive members.

2. A magnetic head according to claim 1, in which said first and second portions of said plurality of coil forming electrically conductive members respectively extend from said respective ends of respective ones of said plurality of electrically conductive films substantially at right angles.

3. A magnetic head according to claim 1, in which the respective connections between said third and fourth portions are in alignment and are separated from one another when seen in plan view.

4. A magnetic head according to said claim 3, in which said first and second portions of said plurality of coil forming electrically conductive members respectively extend from respective ends of respective ones of said plurality of electrically conductive films in such a manner that an upper one of said respective first and second portions extends longer than an adjacent lower one of said respective first and second portions of said plurality of coil forming electrically conductive members.

5. A magnetic head according to claim 1, in which said first, second, third and fourth portions of said plurality of coil forming electrically conductive members are disposed substantially on respective given areas on said substrate when seen in plan view, and the connections between said third and fourth portions of said plurality of coil forming electrically conductive members are electrically insulated from one another and are disposed substantially one upon another on the path of said plurality of coil forming electrically conductive members when seen in plan view.

6. A magnetic head according to claim 5, in which said connections are disposed along the path of said plurality of coil forming electrically conductive members and are separated from one another when seen in plan view.

7. A magnetic head according to claim 6, in which said plurality of coil forming electrically conductive members are electrically insulated from one another by insulating films, and said connections between said third and fourth portions of said plurality of coil forming electrically conductive members are made through openings formed in given portions of said insulating films.

8. A magnetic head comprising:

a magnetic film disposed on a ferrite substrate, said magnetic film forming a magnetic gap between said magnetic film and said substrate at one end of said magnetic film, said gap lying substantially in a plane including an end surface of said substrate, said magnetic film being magnetically coupled with said substrate at the other end of said magnetic film;

a plurality of electrically conductive films laid one upon another substantially on a given area on said substrate when seen in plan view, the lamination of said plurality of electrically conductive films traversing an area under said magnetic film, said plurality of electrically conductive films being electrically insulated from one another and from said magnetic film and substrate;

a plurality of coil forming electrically conductive members including first, second, third and fourth portions, said first and second portions respectively extending from respective ends of respective ones of said plurality of electrically conductive films in a direction opposite to said end surface of said substrate, said third and fourth portions respectively extending toward each other from the respective extended ends of said first and second portions, said first and second portions being respectively laid one upon another substantially on respective given areas on said substrate, the respective extended ends of said third and fourth portions being electrically connected with each other outside of said area under said magnetic film so that said plurality of electrically conductive films are connected in series through said plurality of coil forming electrically conductive members to thereby form a continuous coil, the respective connections between said third and fourth portions being disposed, when seen in plan view and in the longitudinal direction of said lamination of said plurality of electrically conductive films, within a length which is obtained by moving in parallel the length of said lamination of said plurality of electrically conductive films and outside of said area under said magnetic film; and a pair of lead-out electrically conductive members respectively connected to the two free ends of said continuous coil formed by said plurality of electrically conductive films and said plurality of coil forming electrically conductive members.

9. A magnetic head according to claim 8, in which said first and second portions of said plurality of coil forming electrically conductive members respectively extend from respective ends of respective ones of said plurality of electrically conductive films in such a manner that an upper one of said respective first and second portions extends longer than an adjacent lower one of said respective first and second portions of said plurality of coil forming electrically conductive members, and the respective connections between said third and fourth portions are in alignment and are separated from one another when seen in plan view.

10. A magnetic head according to claim 8, in which said first, second, third and fourth portions of said plurality of coil forming electrically conductive members are disposed substantially on respective given areas on said substrate when seen in plan view and are insulated from one another by insulating films, and the respective connections between said third and second portions of said plurality of coil forming electrically conductive members are made through openings formed in given portions of said insulating films and are disposed separately one from another on the path of said plurality of coil forming electrically conductive members when seen in plan view.

* * * * *